US006243811B1

(12) United States Patent
Patel

(10) Patent No.: US 6,243,811 B1
(45) Date of Patent: Jun. 5, 2001

(54) METHOD FOR UPDATING SECRET SHARED DATA IN A WIRELESS COMMUNICATION SYSTEM

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/127,768

(22) Filed: Jul. 31, 1998

(51) Int. Cl.[7] .................................................. H04L 9/00

(52) U.S. Cl. ......................... 713/167; 713/161; 713/171; 380/268; 380/278; 380/283

(58) Field of Search .................................... 713/167, 161, 713/169, 171; 380/268, 278, 283

(56) References Cited

U.S. PATENT DOCUMENTS

| 4,658,093 | * | 4/1987 | Hellman | 380/25 |
| 4,995,083 | * | 2/1991 | Baker et al. | 380/23 |
| 5,077,790 | * | 12/1991 | D'Amico et al. | 380/23 |
| 5,153,919 | | 10/1992 | Reeds, III et al. | |
| 5,613,214 | | 3/1997 | Shirasawa et al. | |

FOREIGN PATENT DOCUMENTS

WO 99/38288    7/1999  (WO).

OTHER PUBLICATIONS

M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, *IEEE computer society symposium on research in security and privacy*, 72–84 May 1992.
R. Bird, I. Gopal, A. Herzberg, P. Janson, S. Kutten, R. Molva, and M. Yung, Systematic design of two–party authentication protocols, *Advances in Cryptology—Crypto*, 1991.
M. Blum and S. Micali, How to generate cryptographically strong sequences of pseudo random bits, *SIAM J. Computing*, 13 No. 4:850–864,1984.
R. B. Boppana and R. Hirschfeld, Pseudorrandom generators and complexity classes, *Advances in Computing Research*, 5 (S. Micali, Ed.), JAI Press, CT.
U.S. Department of Commerce/N.I.S.T., *Digital Signature Standard*, FIPS 186, May 1994.
O. Goldreich and L. A. Levin, A hard–core predicate for all one way functions, *Proceedings of 21st STOC*, 25–32, 1989.

(List continued on next page.)

Primary Examiner—Thomas R. Peeso

(57) ABSTRACT

In the method for updating secret shared data (SSD) in a wireless communication system, a first party outputs a first random number as a first challenge wherein the first party is one of a network and a mobile. A second party generates a second random number in response to the first challenge. The second party is the mobile if the first party is the network, and the second party is the network if the first party is the mobile. The second party generates a first challenge response by performing a keyed cryptographic function (KCF) on the first challenge and the second random number using a secondary key, which is not the SSD and is derived from a root key. The second party then transfers the second random number, as a second challenge, and the first challenge response to the first party. The first party verifies the second party based on the first and second challenges and the first challenge response, generates a second challenge response by performing the KCF on the second challenge using the secondary key, and transfers the second challenge response to the second party. The second party verifies the first party based on the second challenge and the second challenge response. Both parties respectively establish the SSD based on the first and second challenges.

22 Claims, 3 Drawing Sheets

OTHER PUBLICATIONS

S. Goldwasser and A. Micali, Probabilistic encryption, *Journal of Computer and Systems Science*, 28: 270–299, 1984.

L. Gong, T. Lomas, R. Needham and J. Saltzer, Protecting poorly chosen secrets from guessing attacks, *IEEE Journal on Selected Areas in Communications*, 11(5): 648–656, Jun. 1993.

EIA/TIA, Cellular RadioTelecommunications Intersystem Operations IS–41 Rev. D, 1997.

T. Lomas, L. Gong, J. Saltzer and R. Needham, Reducing Risks from Poorly Chosen Keys, *Proceedings of the 12th ACM Symposium on Operating System Principles, ACM Operating Systems Review*, 23(5): 14–18, Dec. 1989.

S. Patel, Information Leakage in Encrypted Key Exchange, *Proceedings of DIMACS workshop on Network Threats*, 38: 33–40, Dec. 1996.

S. Patel, Number theoretic attacks on secure password schemes, *IEEE symposium on security and privacy*, 236–247, May 1997.

S. Patel, Weaknesses of the north american wireless authentication protocol, *IEEE Personal Communications*, 40–44, Jun. 1997.

A. C. Yao, Theory and applications of trapdoor functions, *Proceedings of 23rd FOCS*, 80–91, 1982.

M. Beller, L. Chang and Y. Yacobi, Privacy and authentication on a portable communication sytem, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, *IEEE symposium on security and privacy*, May 1998.

TIA/EIA Interim Standard, *Over–the Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97, 1997.

Oded Goldreich, Shafi Goldwasser, Silvio Micali, How to Construct Random Functions, Journal of the Association for Computing Machinery, vol. 33, No. 4, pp. 792–807, Oct. 1986.

Brown, D., "Techniques for Privacy and Authentication in a Personal Communication Systems," IEEE Personal Communications, U.S., IEEE Communications Society, vol. 2, Nr. 4, pp. 6–10.

Park, Ch–S, "On Certificate–Based Security Protocols for Wireless Moboile Communication Systems," IEEE Network: The Magazine of Computer Communications, IEEE Inc., New York, U.S., vol. 11, Nr. 5, pp. 50–55.

\* cited by examiner

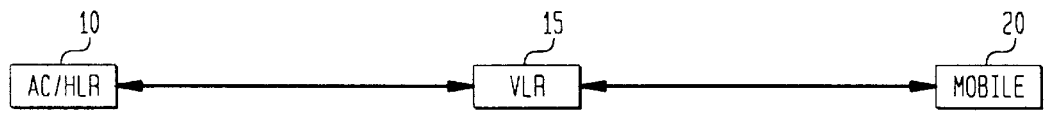
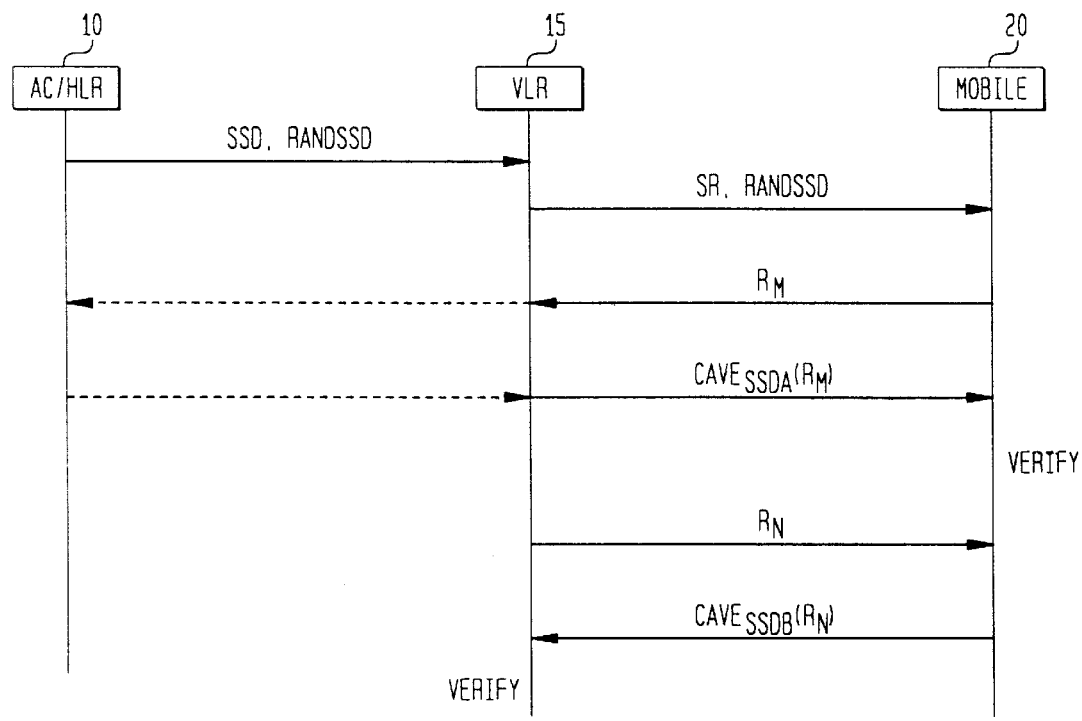

METHOD FOR UPDATING SECRET SHARED DATA IN A WIRELESS COMMUNICATION SYSTEM

RELATED APPLICATIONS

The following applications, filed concurrently with the subject application, are related to the subject application and are hereby incorporated by reference in their entirety: application no. unknown entitled METHOD FOR TWO PARTY AUTHENTICATION AND KEY AGREEMENT by the inventor of the subject application; application no. unknown entitled METHOD FOR TRANSFERRING SENSITIVE INFORMATION USING INITIALLY UNSECURED COMMUNICATION by the inventor of the subject application; application no. unknown entitled METHOD FOR SECURING OVER-THE-AIR COMMUNICATION IN A WIRELESS SYSTEM by the inventor of the subject application; and application no. unknown entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

BACKGROUND OF THE INVENTION

1. Field of the Invention

The present invention relates to a method for updating secret shared data in a wireless communication system.

2. Description of Related Art

The U.S. currently utilizes three major wireless systems, with differing standards. The first system is a time division multiple access system (TDMA) and is governed by IS-136, the second system is a code division multiple access (CDMA) system governed by IS-95, and the third is the Advanced Mobile Phone System (AMPS). All three communication systems use the IS-41 standard for intersystem messaging, which defines the authentication procedure when updating the secret shared data.

FIG. 1 illustrates a wireless system including an authentication center (AC) and a home location register (HLR) 10, a visiting location register (VLR) 15, and a mobile 20. While more than one HLR may be associated with an AC, currently a one-to-one correspondence exists. Consequently, FIG. 1 illustrates the HLR and AC as a single entity, even though they are separate. Furthermore, for simplicity, the remainder of the specification will refer to the HLR and AC jointly as the AC/HLR. Also, the VLR sends information to one of a plurality of mobile switching centers (MSCs) associated therewith, and each MSC sends the information to one of a plurality of base stations (BSs) for transmission to the mobile. For simplicity, the VLR, MSCs and BSs will be referred to and illustrated as a VLR. Collectively, the ACs, HLRs, VLRs, MSCs, and BSs operated by a network provider are referred to as a network.

A root key, known as the A-key, is stored only in the AC/HLR 10 and the mobile 20. There is a secondary key, known as Shared Secret Data SSD, which is sent to the VLR 15 as the mobile roams (i.e., when the mobile is outside its home coverage area). SSD is generated from the A-key and a random seed RANDSSD using a cryptographic algorithm or function. A cryptographic function is a function which generates an output having a predetermined number of bits based on a range of possible inputs. A keyed cryptographic function (KCF) is a type of cryptographic function that operates based on a key; for instance, a cryptographic function which operates on two or more arguments (i.e., inputs) wherein one of the arguments is the key. From the output and knowledge of the KCF in use, the inputs can not be determined unless the key is known. Encryption/decryption algorithms are types of cryptographic functions. So are one-way functions like pseudo random functions (PRFs) and message authentication codes (MACs). The expression $KCF_{SK}(R_N')$ represents the KCF of the random number $R_N'$ using the session key SK as the key. A session key is a key that lasts for a session, and a session is a period of time such as the length of a call.

In the IS-41 protocol, the cryptographic function used is CAVE (Cellular Authentication and Voice Encryption). When the mobile 20 roams, the VLR 15 in that area sends an authentication request to the AC/HLR 10, which responds by sending that mobile's SSD. Once the VLR 15 has the SSD, it can authenticate the mobile 20 independently of the AC/HLR 10. For security reasons, the SSD is periodically updated.

FIG. 2 illustrates the communication between the AC/HLR 10, the VLR 15 and the mobile 20 to update the SSD.

As discussed above, the AC/HLR 10 generates a random number seed RANDSSD, and using the CAVE algorithm generates a new SSD using the random number seed RANDSSD. The SSD is 128 bits long. The first 64 bits serve as a first SSD, referred to as SSDA, and the second 64 bits serve as a second SSD, referred to as SSDB. As shown in FIG. 2, the AC/HLR 10 provides the VLR 15 with the new SSD and the RANDSSD. The VLR 15 then sends the RANDSSD to the mobile 20 along with a session request SR. The session request SR instructs the mobile 20 to perform the SSD update protocol which is described in detail below. In response to receipt of the RANDSSD and the session request SR, the mobile 20 uses the CAVE algorithm to generate the new SSD using the RANDSSD, and generates a random number $R_M$ using a random number generator. The mobile 20 sends the random number $R_M$ to the VLR 15. The mobile 20 also performs the CAVE algorithm on the random number $R_M$ using the new SSDA as the key. This calculation is represented by $CAVE_{SSDA}(R_M)$.

One of the VLR 15 and the AC/HLR 10, also calculates $CAVE_{SSDA}(R_M)$, and sends the result to the mobile 20. The mobile 20 authenticates the network if $CAVE_{SSDA}(R_M)$, which it calculated, matches that received from the network.

Next, and usually after receiving a signal from the mobile 20 indicating verification, the VLR 15 generates a random number $R_N$, and sends the random number $R_N$ to the mobile 20. Meanwhile, the VLR calculates $CAVE_{SSDA}(R_N)$. Upon receipt of $R_N$, the mobile 20 calculates $CAVE_{SSDA}(R_N)$, and sends the result to the VLR 15. The VLR 15 authenticates the mobile if $CAVE_{SSDA}(R_N)$ which it calculated, matches that received from the mobile 20. The random numbers $R_M$ and $R_N$ are referred to as challenges, while $CAVE_{SSDA}(R_M)$ and $CAVE_{SSDA}(R_N)$ are referred to as challenge responses. Once the authentication is complete, the mobile 20 and the network generate session keys using SSDB.

In this protocol, the SSD is itself used to answer the challenges from the mobile 20 and the network. This allows an attack when an old RANDSSD and SSD pair are revealed. Knowing this pair is enough to query the mobile 20, and answer its challenge. Thus an attacker can issue an SSD update to the mobile 20, and answer the challenge from the mobile. Once the revealed SSD is accepted, and despite a secure session key agreement protocol (i.e., a protocol on communication between a mobile and a network to establish a session key), the attacker can impersonate the network and place a call to the mobile 20 under fraudulent identities. For example, the impersonator can insert his own caller id or name and pretend to be someone else. The attacker can pretend to be a credit card company, and ask to verify card number and pin. Or even use the telephone company name in the caller name field and ask to verify calling card numbers, etc.

SUMMARY OF THE INVENTION

In the method for updating secret shared data (SSD) in a wireless communication system according to the present invention, a first party issues a random number as a first challenge and a second party responds with a first challenge response. The first party is either the network or a mobile. The second party is the mobile when the first party is the network, and the second party is the network when the first party is the mobile. The second party generates a second random number. Then, the first challenge response is generated by performing a keyed cryptographic function (KCF) on the first challenge and the second random number using a secondary key. The secondary key is derived by both the first and second party from a root key, and is not the secret shared data. The second party generates the second random number upon receipt of the first challenge, and uses the second random number as a second challenge. The first party verifies the second party based on the first challenge and receipt of the second challenge and the first challenge response. After verification, the first party performs the KCF on the second challenge using the secondary key to generate a second challenge response. Based on the second challenge and receipt of the second challenge response, the second party verifies the first party. Using the first and second challenges, the secret shared data is generated by both parties. In this manner, a different key, the secondary key, from the secret shared data key is used in answering challenges.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein:

FIG. 1 is a block diagram illustrating the basic components of a wireless system;

FIG. 2 illustrates the communication between the authentication center/home location register, visiting location register, and the mobile to update the secret shared data according to the IS-41 standard;

DETAILED DESCRIPTION OF THE PREFERRED EMBODIMENTS

The method or protocol for updating the secret shared data according to the present invention is employed by the same wireless system shown in FIG. 1. In the method according to the present invention, however, the AC/HLR 10 and the mobile 20 also generate another key, referred to as the M-key, based on the root or A-key. For example, the M-key is generated by applying a pseudo random function (PRF) indexed by the A-key on a known value. A practical PRF is the well-known Data Encryption Standard-Cipher Block Chaining (DES-CBC) from the NIST (National Institute of Standards). In a preferred embodiment, DES-CBC, indexed by a 64-bit A-key on a value known to both the network and the mobile 20, produces a 64-bit M-key.

Figure 3:
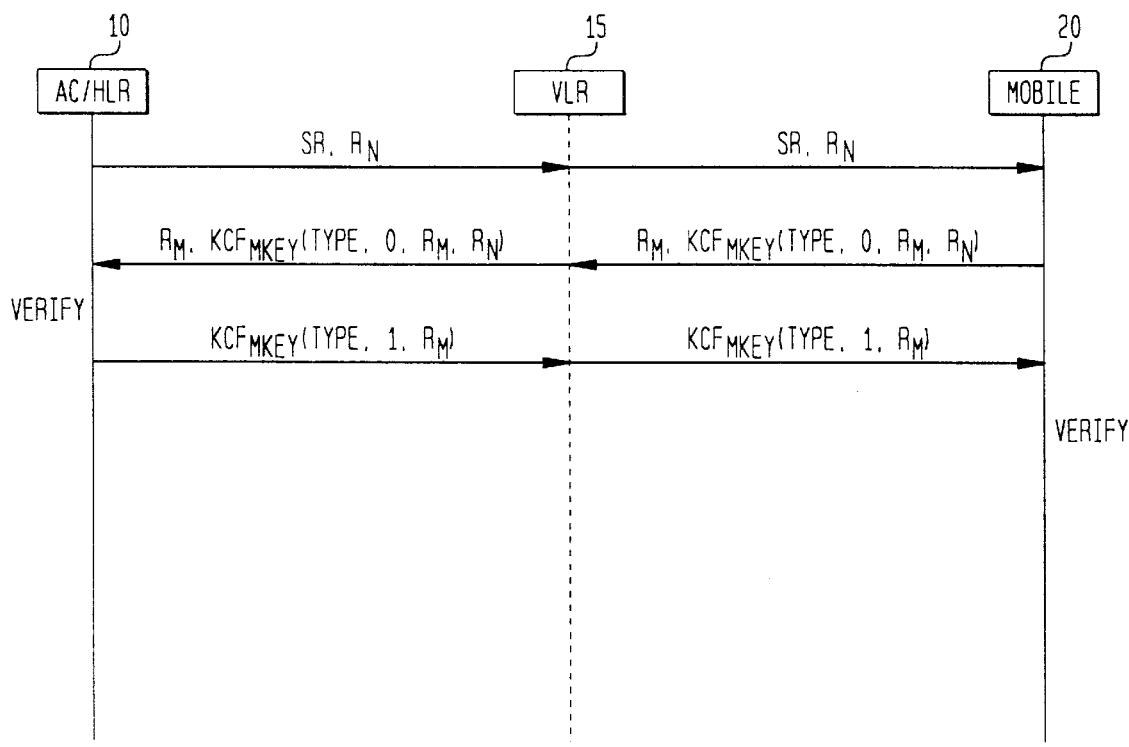
FIG. 3 illustrates the communication between the authentication center/home location register, visiting location register, and the mobile to update the secret shared data according to one embodiment of the present invention.

FIG. 3 illustrates the communication between the AC/HLR 10, the VLR 15, and the mobile 20 to update the secret shared data according to one embodiment of the present invention. As shown, the VLR 15 merely acts as a conduit for communication between the AC/HLR 10 and the mobile 20. More specifically, the authentication protocol according to the present invention is performed between the AC and the mobile 20.

To update the SSD, the AC/HLR 10 generates a random number $R_N$ using a random number generator, and sends the random number $R_N$ along with a session request SR to the mobile 20. The session request SR instructs the mobile 20 to perform the update SSD protocol. In response to the session request SR, the mobile 20 generates a random number $R_M$ using a random number generator, and performs a keyed cryptographic algorithm or function (KCF) on the random numbers $R_N$ and $R_M$, Type data, and id data 0 using the M-key as the key. This calculation is represented as $KCF_{M-Key}(Type, 0, R_M, R_N)$. Preferably, the KCF is a keyed message authentication code such as HMAC, but could be a PRF such as DES-CBC. The Type data represents the type of protocol being performed; namely, the SSD update protocol. Other protocol types includes call origination, call termination, and mobile registration. The id data 0 indicates that the communication issued from the mobile. Id data 1, by contrast, indicates that the communication is from the network.

Because the AC/HLR 10 initiated the SSD update protocol with the session request SR, the AC/HLR 10 knows the Type data, and because communication from mobiles include the same id data of 0, this value is known as well by the AC/HRL 10. Accordingly, upon receipt of $R_M$, the AC/HLR 10 calculates $KCF_{M-Key}(Type, 0, R_M, R_N)$. The AC/HLR 10 then verifies whether the calculated version of $KCF_{M-Key}(Type, 0, R_M, R_N)$ matches the version received from the mobile 20. If a match is found, the AC/HLR 10 authenticates the mobile 20. Next, the AC/HLR 10 calculates $KCF_{M-Key}(Type, 1, R_M)$, where 1 is the id data of the network, and sends the calculated result to the mobile 20.

The mobile 20 knows the Type data from the session request SR, and knows that communication from the network includes id data of 1. Accordingly, the mobile 20 calculates $KCF_{M-Key}(Type, 1, R_M)$. The mobile 20 then verifies whether the calculated version of $KCF_{M-Key}(Type, 1, R_M)$ matches the version received from the AC/HLR 10. If a match is found, the mobile 20 authenticates the network.

After authenticating the network, the mobile 20 and the AC/HLR 10 both have random numbers $R_N$ and $R_M$. Both the mobile 20 and AC/HLR 10 generate the SSD as $PRF_{A-Key}(R_M, R_N)$; wherein the PRF is preferably DES-CBC.

As an alternative, instead of generating and sending a unique random number $R_N$ to each mobile with the session request SR, the AC/HLR 10 generates a global random number $R_N$; namely, the same random number for all the mobiles. This alternative embodiment applies, however, when the anticipated response time for the mobile, as monitored by the network, is kept the same as when a unique random number $R_N$ is sent. If longer response durations are desired when using the global random number $R_N$, then, preferably, the embodiment discussed below with respect to FIG. 5 should be used.

The IS41 protocol allows for SSD update via sharing with the VLR 15. The AC/HLR 10 sends the SSD to the VLR 15, and the VLR 15 challenges the mobile 20 and answers the challenges from the mobile 20. In the protocol according to the present invention the SSD is not used to answer challenges, and thus the network impersonation problem discussed with respect to IS41 is not possible. Furthermore, even if the M-key is revealed to an attacker, there is no direct way to obtain the A-key therefrom because a one-way function was used to generate the M-key. Even if the attacker knows an old $R_M$, $R_N$ and SSD, there is no way to use that information and the M-key information to get either the network or the mobile 20 to accept the revealed SSD because one of the sides in the communication will be using its on challenge, which with very high probability will be different than the old ones. Further, the new SSD will be generated by the PRF of the new challenge using the A-key, and the attacker does not know the A-key.

Figure 4:
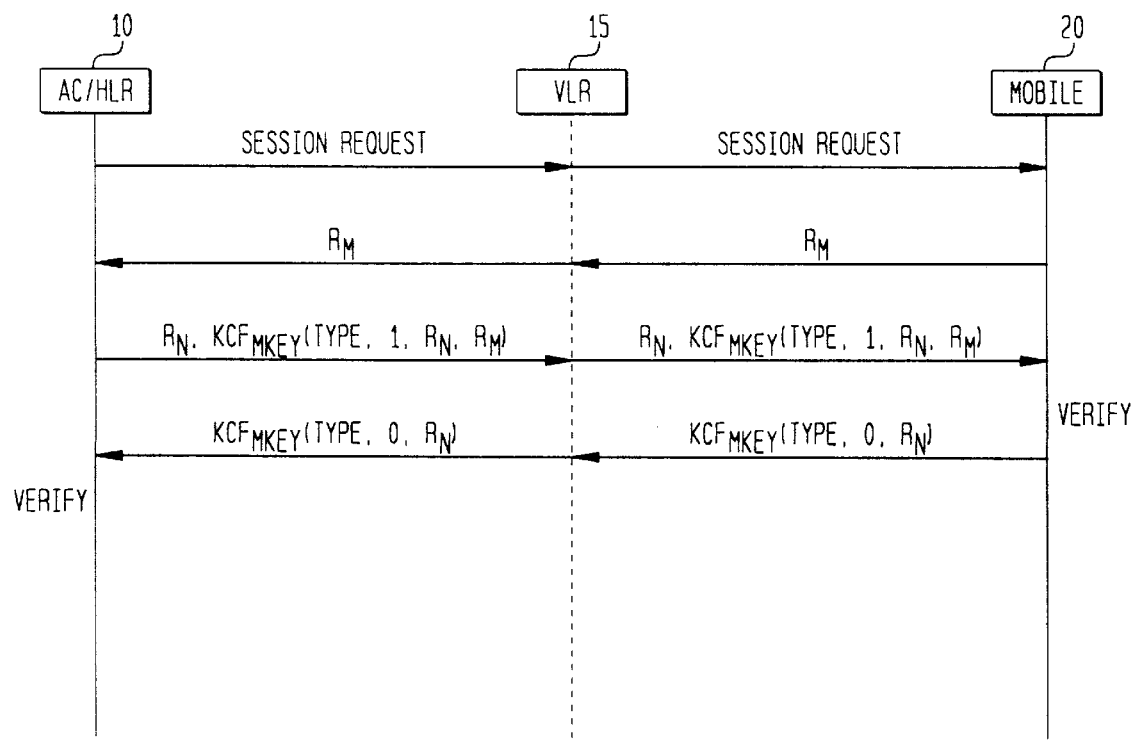
FIG. 4 illustrates the communication between the authentication center/home location register, visiting location register, and the mobile to update the secret shared data according to another embodiment of the present invention.

The SSD update protocol discussed above with respect to FIG. 3, however, allows a cryptanalyst to mount a chosen plaintext attack against the M-key. Namely, a cryptanalyst can impersonate the network and query the mobile 20 by sending various challenges $R_N$. By collecting the responses, the cryptanalyst might be able to recover the M-key. FIG. 4 illustrates the communication between the AC/HLR 10, the VLR 15, and the mobile 20 to update the secret shared data according to another embodiment of the present invention, which overcomes the problem noted above with respect to FIG. 3. As shown, in this embodiment, the VLR 15 also acts as a conduit for communication between the AC/HLR 10 and the mobile 20. More specifically, the authentication protocol according to the present invention is performed between the AC and the mobile 20.

To update the SSD, the AC/HLR 10 generates a session request SR to initiate the SSD update. In response, the mobile 20 generates a random number $R_M$, and sends the random number $R_M$ to the AC/HLR 10. The AC/HLR 10 generates the random number $R_N$, and calculates the $KCF_{M-Key}$(Type, 1, $R_M$, $R_N$), where 1 is the network id data. The AC/HLR 10 sends both the random number $R_N$ and the $KCF_{M-Key}$(Type, 1, $R_M$, $R_N$) to the mobile 20.

Upon receipt of the random number $R_N$, the mobile 20 calculates $KCF_{M-Key}$(Type, 1, $R_M$, $R_N$). The mobile 20 then verifies whether the calculated version of $KCF_{M-Key}$(Type, 1, $R_M$, $R_N$) matches the version received from the AC/HLR 10. If a match is found, the mobile 20 authenticates the network.

Next, the mobile 20 calculates $KCF_{M-Key}$(Type, 0, $R_N$), where 0 is the id data of the mobile 20, and sends the calculated result to the AC/HLR 10. The AC/HLR 10, meanwhile, calculates $KCF_{M-Key}$(Type, 0, $R_N$) as well. The AC/HLR 10 then verifies whether the calculated version of $KCF_{M-Key}$(Type, 0, $R_N$) matches the version received from the mobile 20. If a match is found, the AC/HLR 10 authenticates the mobile 20.

After authenticating the network, the mobile 20 and the AC/HLR 10 both have random numbers $R_N$ and $R_M$. Both the mobile 20 and AC/HLR 10 generate the SSD as $PRF_{A-Key}$($R_M$, $R_N$); wherein the PRF is preferably DES-CBC.

In the embodiment of FIG. 4, an attacker can not query mobiles with a chosen text and expect a response. The attacker can only collect known texts from previous sessions, because the initiator of the update, the network, does not send the first challenge in the clear.

Figure 5:
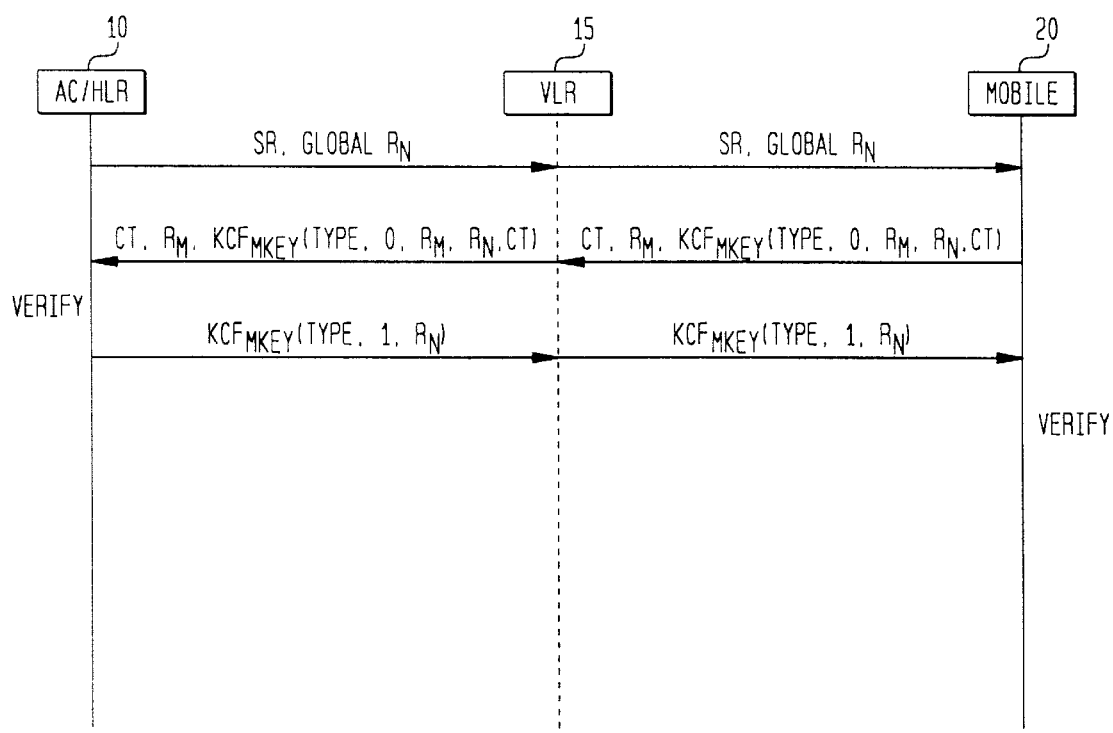
FIG. 5 illustrates the communication between the authentication center/home location register, visiting location register, and the mobile to update the secret shared data according to a further embodiment of the present invention.

FIG. 5 illustrates the communication between the AC/HLR 10, the VLR 15, and the mobile 20 to update the secret shared data according to a further embodiment of the present invention. As shown, the VLR 15 acts as a conduit for communication between the AC/HLR 10 and the mobile 20. More specifically, the authentication protocol according to the present invention is performed between the AC and the mobile 20.

To update the SSD, the AC/HLR 10 generates and outputs a global random number $R_N$ along with a session request SR to the mobile 20. The session request SR instructs the mobile 20 to perform the update SSD protocol. In the embodiment of FIG. 3, the random number $R_N$ initially sent by the network to the mobile 20 was unique to the mobile 20. Different random numbers are generated and sent to other mobiles in updating their SSDs. In the embodiment of FIG. 5, however, the same random number $R_N$ is sent by the AC/HLR 20 to all the mobiles 20. As discussed above, the embodiment of FIG. 5 is preferred over using a global random number $R_N$ in the embodiment of FIG. 3 when providing for a longer response duration from the mobile 20 is desired.

As shown in FIG. 5, in response to the session request SR and the random number $R_N$ sent by the AC/HLR 10, the mobile 20 generates a random number $R_M$, generates a count value CT, and calculates $KCF_{M-Key}$(Type, 0, $R_M$, $R_N$, CT), where 0 is the id data for the mobile 20. The mobile 20 includes a counter which generates the count value CT. The mobile 20 increments the count value prior to generating the challenge response (i.e., $KCF_{M-Key}$(Type, 0, $R_M$, $R_N$, CT)) to each SSD update request. The mobile 20 sends the count value CT, random number $R_M$, and $KCF_{M-Key}$(Type, 0, $R_M$, $R_N$, CT) to the network.

Upon receipt of the random number R, and the count value CT, the AC/HLR 10 stores the count value CT and determines whether the received count value CT exceeds the previously stored count value. If the received count value CT does exceed the previously stored count value, then the AC/HLR 10 goes forward with verifying the mobile 20. Namely, based on the received random number $R_M$ and the count value CT, the AC/HLR 10 calculates $KCF_{M-Key}$(Type, 0, $R_M$, $R_N$, CT), and determines whether this calculated version matches the version received from the mobile 20.

If a match is found, the AC/HLR 10 authenticates the mobile 20. If the received count value CT does not exceed the previously stored count value, the mobile 20 is not verified.

Once the mobile 20 has been verified, the AC/HLR 10 calculates $KCF_{M-Key}$(Type, 1, $R_M$), where 1 is the id data for the network, and sends the calculated result to the mobile 20. The mobile 20, meanwhile, calculates $KCF_{M-Key}$(Type, 1, $R_M$) as well. The mobile 20 then verifies whether the calculated version of $KCF_{M-Key}$(Type, 1, $R_M$) matches the version received from the AC/HLR 10. If a match is found, the mobile 20 authenticates the network.

After authenticating the network, the mobile 20 and the AC/HLR 10 both have random numbers $R_N$ and $R_M$ and the count value CT. Both the mobile 20 and AC/HLR 10 generate the SSD as $PRF_{A-Key}$($R_M$, $R_N$, CT); wherein the PRF is preferably DES-CBC.

Because an attacker uses prior challenges and challenge responses when mounting an attack as discussed above with respect to FIG. 3, such an attack will fail if made on the protocol of FIG. 5. The reason is that the attacker will be using a challenge response based on an old count value. Consequently, the network will not verify the attacker, and the attacker can not generate the SSD.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method for updating secret shared data (SSD) at a first party in a wireless communication system, comprising:
   (a) receiving a random number from a second party as a first challenge, said first challenge being a global challenge from said second party;
   (b) generating a second random number in response to said first challenge;
   (c) generating a first challenge response by performing a keyed cryptographic function (KCF) on said first challenge and said second random number using a secondary key;
   (d) transferring said second random number, as a second challenge, and said first challenge response to said second party;
   (e) receiving a second challenge response from said second party, said second challenge response being a result of performing said KCF on said second challenge using said secondary key;
   (f) verifying said second party based on said second challenge and said second challenge response; and
   (g) establishing said SSD based on said first and second challenges.

2. The method of claim 1, wherein said first party is a network and said second party is a mobile.

3. The method of claim 2, further comprising:
   (h) transferring an update SSD request to said mobile; and wherein
      said step (a) receives said first challenge in response to said update SSD request.

4. The method of claim 1, wherein said step (c) generates said first challenge response by performing said KCF on said first challenge, said second challenge, and an identifier for said first party using said secondary key.

5. The method of claim 1, wherein said step (c) generates said first challenge response by performing said KCF on said first challenge, said second challenge and type data using said secondary key, said type data indicating an update SSD protocol is being performed by said first and second parties.

6. The method of claim 1, wherein said step (c) generates said first challenge response by performing said KCF on said first challenge, said second challenge, an identifier for said first party and type data using said secondary key, said type data indicating an update SSD protocol is being performed by said first and second parties.

7. The method of claim 1, wherein said first party is a mobile and said second party is a network.

8. The method of claim 7, further comprising:
   (k) incrementing a count value in response to said first challenge; and wherein
      said step (c) generates said first challenge response by performing said KCF on said first challenge, said second challenge, and said count value using said secondary key;
      said step (d) transfers said second challenge, said first challenge response, and said count value from said mobile to said network.

9. The method of claim 1, wherein said secondary key is derived from a root key.

10. The method of claim 1, wherein said secondary key is not a secret shared data.

11. A method for updating secret shared data (SSD) at a first party in a wireless communication system, comprising:
    (a) globally outputting a random number as a first challenge to a second party;
    (b) receiving a second random number, as a second challenge, and a first challenge response from said second party, said first challenge response being a result of a keyed cryptographic function (KCF) on said first challenge and said second random number using a secondary key;
    (c) verifying said second party based on said first and second challenges and said first challenge response; and
    (d) establishing said SSD based on said first and second challenges.

12. The method of claim 11, wherein said first party is a mobile and said second party is a network.

13. The method of claim 12, further comprising:
    (e) receiving an update SSD request from said network; and wherein
       said step (a) outputs said first challenge in response to said update SSD request.

14. The method of claim 11, wherein said first party is a network and said second party is a mobile.

15. The method of claim 11, further comprising:
    (e) generating a second challenge response by performing said KCF on said second challenge using said secondary key; and
    (h) transferring said second challenge response to said second party.

16. The method of claim 15, wherein said step (e) generates said second challenge response by performing said KCF on said second challenge and an identifier for said first party using said secondary key.

17. The method of claim 15, wherein said step (e) generates said second challenge response by performing said KCF on said second challenge and type data using said secondary key, said type data indicating an update SSD protocol is being performed by said first and second parties.

18. The method of claim 15, wherein said step (e) generates said second challenge response by performing said KCF on said second challenge, an identifier for said first party and type data using said secondary key, said type data indicating an update SSD protocol is being performed by said first and second parties.

19. The method of claim 11, wherein
    said first party is said network and said second party is a mobile.

20. The method of claim 19, wherein
    said step (b) receives said second challenge, a count value and said first challenge response from said mobile, said first challenge response being a result of performing said KCF on said first challenge, said second challenge, and said count value using said secondary key; and
    said step (e) verifies said mobile based on said first challenge, said second challenge, said first challenge response, and said count: value.

21. The method of claim 11, wherein said secondary key is derived from a root key.

22. The method of claim 11, wherein said secondary key is not a secret shared data.

* * * * *